US009759942B2

(12) United States Patent
Jin et al.

(10) Patent No.: US 9,759,942 B2
(45) Date of Patent: Sep. 12, 2017

(54) DISPLAY PANEL, FABRICATION METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ronghua Jin, Beijing (CN); Chun Wang, Beijing (CN); Junsheng Chen, Beijing (CN); Yuanhui Guo, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 53 days.

(21) Appl. No.: 14/443,583

(22) PCT Filed: Oct. 15, 2014

(86) PCT No.: PCT/CN2014/088684
§ 371 (c)(1),
(2) Date: May 18, 2015

(87) PCT Pub. No.: WO2015/196643
PCT Pub. Date: Dec. 30, 2015

(65) Prior Publication Data
US 2016/0291359 A1    Oct. 6, 2016

(30) Foreign Application Priority Data

Jun. 27, 2014  (CN) .......................... 2014 1 0302223

(51) Int. Cl.
*G02F 1/1334*   (2006.01)
*G02F 1/153*    (2006.01)
(Continued)

(52) U.S. Cl.
CPC .......... *G02F 1/1334* (2013.01); *G02B 5/003* (2013.01); *G02B 5/201* (2013.01); *G02B 5/3025* (2013.01);
(Continued)

(58) Field of Classification Search
CPC .................................................. G02F 2201/44
See application file for complete search history.

(56) References Cited

U.S. PATENT DOCUMENTS

2001/0048494 A1   12/2001 Koma
2008/0002110 A1*  1/2008 Choi ................. G02F 1/133514
                                                      349/106
(Continued)

FOREIGN PATENT DOCUMENTS

CN    101097343 A    1/2008
CN    101246262 A    8/2008
(Continued)

OTHER PUBLICATIONS

First Chinese Office Action Appln. No. 201410302223,3; Dated Mar. 29, 2016.
(Continued)

*Primary Examiner* — Nathanael R Briggs
*Assistant Examiner* — Alexander Gross
(74) *Attorney, Agent, or Firm* — Ladas & Parry LLP

(57) ABSTRACT

A display panel, a fabrication method and a display device thereof are provided. The display panel includes: an array substrate; a color filter substrate, cell-assembled with the array substrate and including a black matrix; a plurality of light-shielding strips, disposed on a side of the color filter
(Continued)

substrate away from the array substrate; an electrode, sandwiching the plurality of light-shielding strips, wherein the black matrix includes a plurality of matrix strips, and each of the plurality of light-shielding strips corresponds to one of the matrix strips of the black matrix, and the light-shielding strip is made of polymer dispersed liquid crystal material or electrochromic material. In this way, a high aperture ratio is ensured while a viewing angle of a display device is increased. Meanwhile, a brightness of the display device is increased, and an image quality is improved.

12 Claims, 3 Drawing Sheets

(51) Int. Cl.
*G02F 1/1335* (2006.01)
*G02B 5/00* (2006.01)
*G02B 5/30* (2006.01)
*G02B 5/20* (2006.01)

(52) U.S. Cl.
CPC ..... *G02B 5/3083* (2013.01); *G02F 1/133512* (2013.01); *G02F 1/153* (2013.01); *G02F 2201/44* (2013.01)

(56) References Cited

U.S. PATENT DOCUMENTS

| 2013/0021561 A1* | 1/2013 | Ahn | G02F 1/133512 349/77 |
| 2013/0089662 A1* | 4/2013 | Hoshi | B29D 11/00788 427/162 |

FOREIGN PATENT DOCUMENTS

| CN | 101387775 A | 3/2009 |
| CN | 102866529 A | 1/2013 |
| CN | 103135240 A | 6/2013 |
| CN | 103135310 A | 6/2013 |
| CN | 103698894 A | 4/2014 |
| CN | 104090414 A | 10/2014 |
| JP | 11-326888 A | 11/1999 |

OTHER PUBLICATIONS

Written Opinion of the International Searching Authority dated Mar. 26, 2015; PCT/CN2014/088684.
International Search Report mailed Jan. 4, 2015; PCT/CN2014/088684.

* cited by examiner

DISPLAY PANEL, FABRICATION METHOD THEREOF AND DISPLAY DEVICE

TECHNICAL FIELD

Embodiments of the invention relate to a display panel, a fabrication method thereof and a display device.

BACKGROUND

A commonly-used passive polarized 3D display device, as shown in FIG. 1, comprises: a backlight unit 1, a first polarizer 2, an array substrate 3, a color filter substrate 4, a second polarizer 5, and a patterned retarder film 6, which are disposed sequentially. On a side of the color filter substrate 4 facing the array substrate 3, a black matrix is provided, and the black matrix includes a plurality of matrix strips 41. Herein, a width of a matrix strip is h, and a sum of a thickness of the color filter substrate and a thickness of the second polarizer is D. In FIG. 1, an angle A is a maximum correct light transmitting angle of one pixel region between adjacent matrix strips 41 on a color filter surface of the color filter substrate 4, and an angle B is a vertical visual angle of the 3D display device, and is also an angle after the angle A is refracted. Therefore, according to the law of refraction, it can be known that half of the vertical visual angle B/2=arc sin (refractive index×sin(A/2)), where the angle A=2 arc tan(h/2D), and the refractive index is a constant value, and generally is assigned a value of 1.5.

In the range of the vertical visual angle B, a user can see an ideal three-dimensional image; out of the range of the vertical visual angle B, due to crosstalk between images in left and right eyes, the obtained three-dimensional image is poor in quality. If it is an ordinary display device, the user's viewing angle is relatively small, so the quality of an obtained image is degraded. In order to expand the range of vertical visual angle, in the prior art, a light-shielding strip is often disposed on a side of the color filter substrate opposite to the array substrate and at a position corresponding to the black matrix, or the light-shielding strip is disposed between the second polarizer and the patterned retarder film and at a position corresponding to the black matrix. However, it may cause a decrease in the aperture ratio of the display device, resulting in a decrease in the brightness of the display device, thereby making the user see images of poor quality.

SUMMARY OF THE INVENTION

Embodiments of the present invention provide a display panel, a fabrication method thereof and a display device, which ensure a high aperture ratio while increasing a viewing angle of the display device, and improve both the brightness of the display device and the image quality.

In one aspect, an embodiment of the present invention provides a display panel, comprising: an array substrate; a color filter substrate, cell-assembled with the array substrate and comprising a black matrix; a plurality of light-shielding strips, disposed on a side of the color filter substrate away from the array substrate; an electrode, sandwiching the plurality of light-shielding strips, wherein the black matrix comprises a plurality of matrix strips, and each of the plurality of light-shielding strips corresponds to one of the matrix strips of the black matrix, and the light-shielding strip is made of polymer dispersed liquid crystal material or electrochromic material.

In another aspect, an embodiment of the present invention provides a fabrication method of a display panel, comprising: forming an array substrate and a color filter substrate; cell-assembling the array substrate and the color filter substrate; forming an electrode and a light-shielding strip on a side of the color filter substrate away from the array substrate and at a position corresponding to a matrix strip in a black matrix of the color filter substrate, so that the electrode sandwiches the light-shielding strip, wherein the light-shielding strip is made of polymer dispersed liquid crystal material or electrochromic material.

In still another aspect, an embodiment of the present invention provides a display device, comprising the display panel as described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
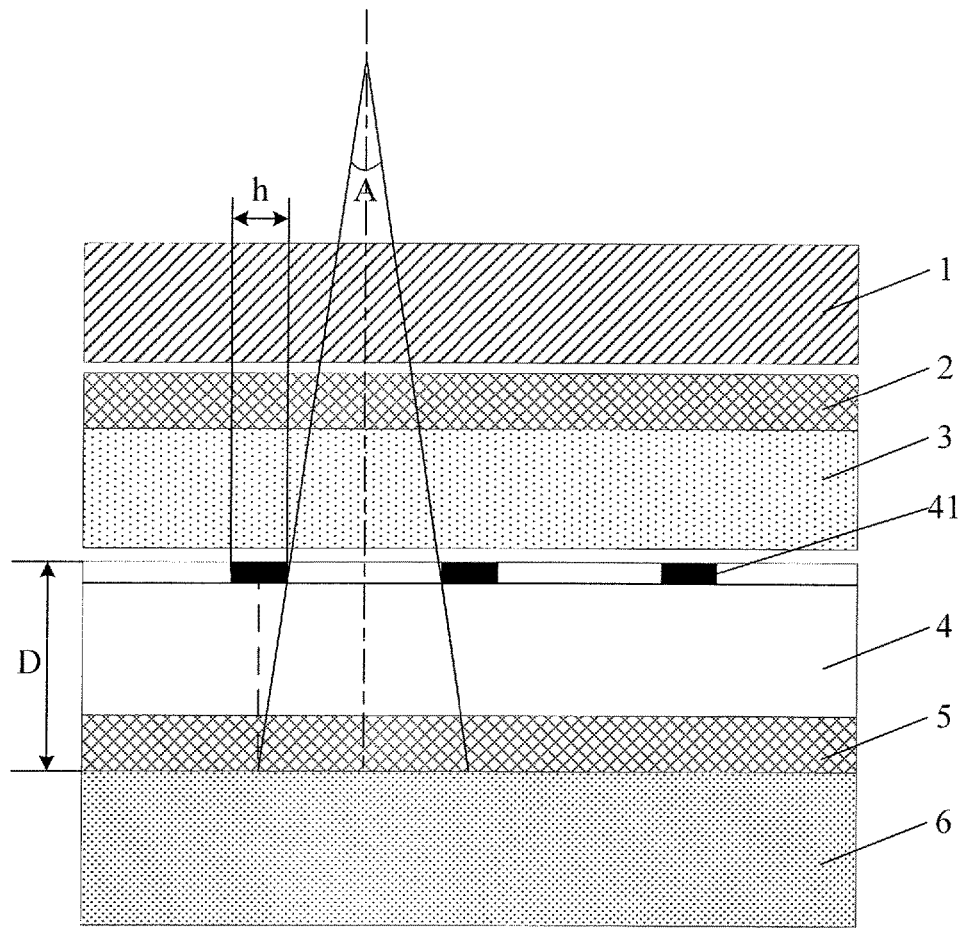
FIG. 1 is an exemplary structural diagram of a display panel.
Figure 2:
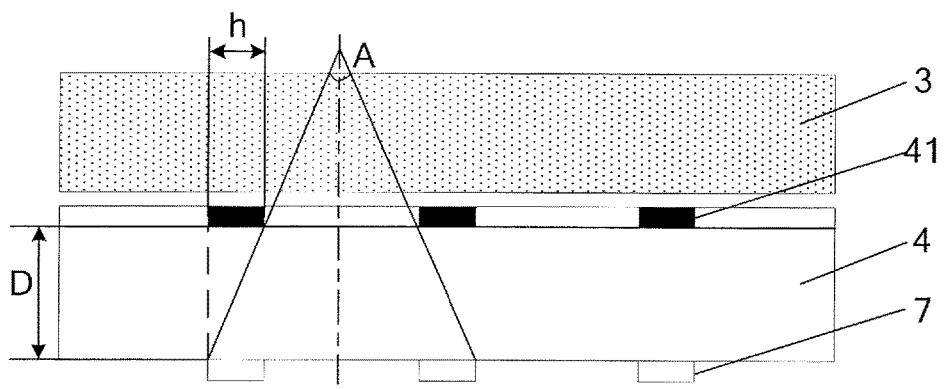
FIG. 2 is a structural schematic diagram of a display panel provided by an embodiment of the present invention.

An embodiment of the present invention provides a display panel; as shown in FIG. 2, the display panel comprises: an array substrate 3 and a color filter substrate 4, the color filter substrate 4 includes a black matrix, and the black matrix includes a plurality of matrix strips 41; the display panel further comprises: a light-shielding strip 7, an electrode 10 for sandwiching the light-shielding strip 7 (not shown in FIG. 1), wherein the light-shielding strip 7 is disposed on a side of the color filter substrate 4 away from the array substrate 3, and corresponds to the matrix strip 41 of the black matrix.

Herein, the light-shielding strip 7 may be made of a polymer dispersed liquid crystal (PDLC) material or an electrochromic material.

The PDLC material and the electrochromic material can be in a transparent state and a non-transparent state according to a change of voltage applied thereon. In the embodiment, the light-shielding strip is made of the PDLC material or the electrochromic material, and it is chosen whether the voltage should be applied to the light-shielding strip made of the PDLC material or the electrochromic material on the basis of the range of user's visual angle, to ensure that the user's visual angle is within the range of viewing angle of the display device, and the aperture ratio of the display device is not decreased.

In the display panel provided by an embodiment of the present invention, a light-shielding strip made of the PDLC material or the electrochromic material is disposed on a side of the color filter substrate opposite to the array substrate and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Furthermore, the brightness of the display device is increased, and the image quality is improved.

Figure 3:
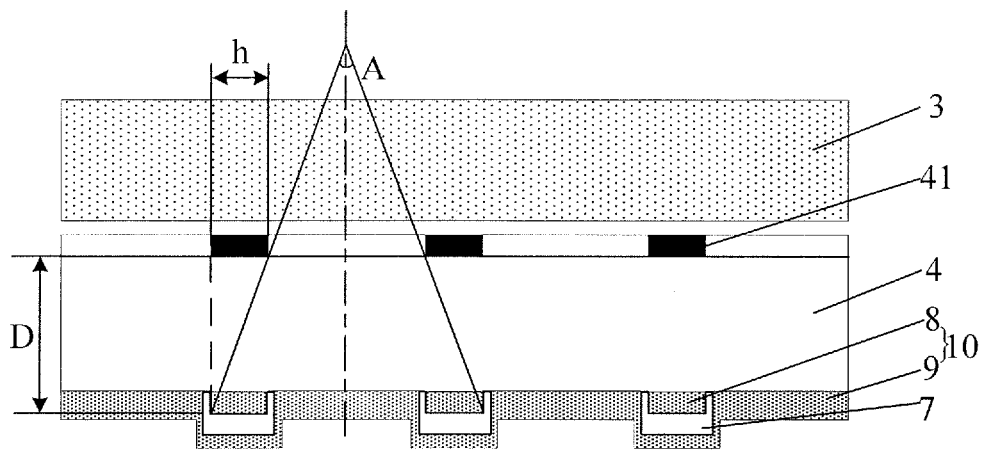
FIG. 3 is a structural schematic diagram of another display panel provided by an embodiment of the present invention.

Exemplarily, as shown in FIG. 3, an electrode 10 of the display panel includes: a first transparent conductive layer 8 and a second transparent conductive layer 9, wherein the first transparent conductive layer 8 is formed between the color filter substrate 4 and the light-shielding strip 7.

Exemplarily, the light-shielding strip 7 completely covers the first transparent conductive layer 8.

Exemplarily, the first transparent conductive layer 8 includes a plurality of first transparent electrode strips.

Exemplarily, a width of each first transparent electrode strip of the first transparent conductive layer 8 is equal to a width of the light-shielding strip.

The second transparent conductive layer 9 is formed on the light-shielding strip 7, to completely cover the light-shielding strip 7 and the color filter substrate 4.

Exemplarily, both the first transparent conductive layer and the second transparent conductive layer are made of inorganic material such as indium tin oxide (ITO), zinc oxide or indium zinc oxide mixed with fluorine, or the like. Both the first transparent conductive layer and the second transparent conductive layer may be formed by a process such as ink-jet printing, evaporation, or photolithograph.

In the display panel provided by the embodiment, the light-shielding strip is made of PDLC. When the vertical visual angle of an user with respect to the display device is in the range of the viewing angle A of the display device, a voltage may be applied to the first transparent conductive layer and the second transparent conductive layer, to generate an electric field between the first transparent conductive layer and the second transparent conductive layer; the electric field is applied to the light-shielding strip made of the PDLC material, and the property of the PDLC material is changed, making the light-shielding strip to be in a transparent state, so that the light transmission is not affected, that is, the light transmitting area is unchanged, thereby ensuring the aperture ratio of the display device. When the vertical visual angle of the user with respect to the display device is out of the range of the viewing angle A of the display device, no voltage is applied to the first transparent conductive layer and the second transparent conductive layer, the PDLC material of the light-shielding strip goes through a reversible change, so that the light-shielding strip is in a non-transparent state, and further, light from the matrix strip to the light-shielding strip is blocked, and light irradiated to a leftmost side of the light-shielding strip can be transmitted through, so the maximum viewing angle A of the display device is: $A = 2 \arctan(h/D)$, where h is a width of the light-shielding strip, and D is a distance between the light-shielding strip and the matrix strip. Therefore, it can be obviously obtained that the viewing angle A of the display device is enlarged. Meanwhile, the aperture ratio of the display device remains unchanged compared with before. So, the aperture ratio of the display device is ensured while increasing the viewing angle of the display device.

Exemplarily, the width of the light-shielding strip 7 is greater than or equal to the width of the matrix strip 41 of the black matrix.

The width of the matrix strip 41 of the black matrix is less than or equal to a preset width.

Exemplarily, a variation range of the width of the matrix strip of the black matrix is not exclusively defined here, but it must satisfy that after improved by the embodiment of the present invention, the maximum viewing angle of the display device is greater than the angle in a conventional technical solution.

Exemplarily, the PDLC material or the electrochromic material may be formed by a coating process, after the coating is completed, UV irradiation may be employed for curing the PDLC material or the electrochromic material.

Exemplarily, the preset width is the width of the matrix strip known to the inventor. In the embodiment, the width of the matrix strip is less than the width of the matrix strip in the conventional solution in the prior art, but the aperture ratio and the display brightness of display device are not affected, and in the actual production, the material required for fabricating the matrix strip is reduced, which greatly saves the production cost.

Figure 4:
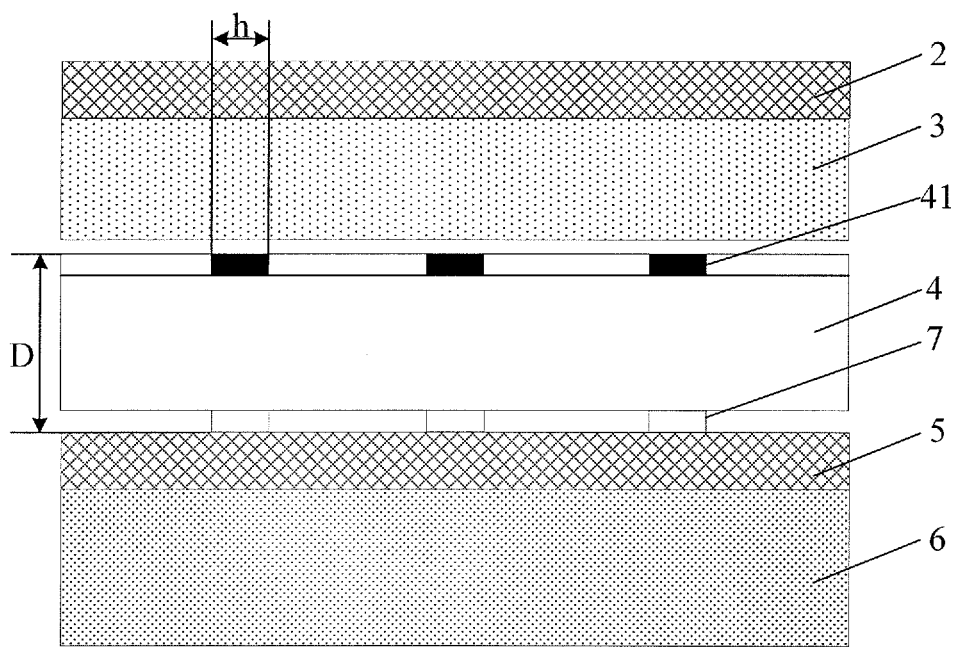
FIG. 4 is a structural schematic diagram of still another display panel provided by an embodiment of the present invention.

When the display panel is a display panel for use in a three dimensional (3D) display device, as shown in FIG. 4, exemplarily, the display panel further comprises:

A first polarizer 2 formed on a side of the array substrate 3 away from the color filter substrate 4 and covering the array substrate 3;

A second polarizer 5 formed on the light-shielding strip 7 and covering the light-shielding strip 7 and the color filter substrate 4; and A patterned phase-difference film 6 covering the second polarizer 5.

Figure 5:
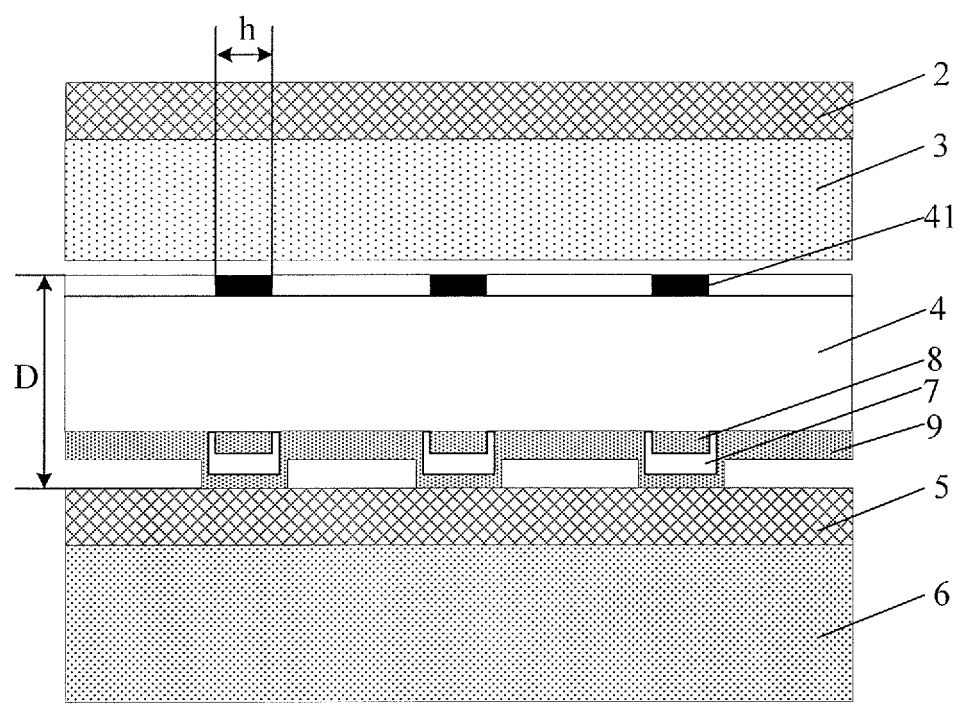
FIG. 5 is a structural schematic diagram of a display panel provided by another embodiment of the present invention.

Optionally, when the display panel is a display panel for use in the 3D display device, as shown in FIG. 5, when a first transparent conductive layer and a second transparent conductive layer are respectively disposed on the up and lower surfaces of the light-shielding strip of the display panel, another feasible solution is that:

The second polarizer 5 may be formed on the second transparent conductive layer 9 to completely cover the second transparent conductive layer 9.

In the display panel provided by an embodiment of the present invention, a light-shielding strip made of the PDLC material or the electrochromic material is disposed on a side of the color filter substrate opposite to the array substrate and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Meanwhile, the brightness of the display device is increased, and the image quality is improved.

An embodiment of the present invention further provides a fabrication method of a display panel, comprising steps of:

101: forming an array substrate and a color filter substrate.

102: cell-assembling the array substrate and the color filter substrate.

103: forming an electrode and a light-shielding strip on a side of the color filter substrate away from the array substrate and at a position corresponding to a matrix strip in a black matrix of the color filter substrate, so that the electrode sandwiches the light-shielding strip.

Herein, the light-shielding strip is made of polymer dispersed liquid crystal (PDLC) material or electrochromic material.

Exemplarily, the PDLC material or the electrochromic material may be formed by a coating process, after the coating is completed, UV irradiation may be employed for curing the PDLC material or the electrochromic material.

In the fabrication method of the display panel provided by the embodiment of the present invention, when the display panel is fabricated, a light-shielding strip made of the PDLC material or the electrochromic material is disposed on a side of the color filter substrate opposite to the array substrate in the display panel and at a position corresponding to the matrix strip of the black matrix; when the user's visual angle is in the range of viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Meanwhile, the brightness of the display device is increased, and the image quality is improved.

Exemplarily, an embodiment of the present invention provides a fabrication method of a display panel, comprising steps of:

201: forming an array substrate and a color filter substrate.

202: cell-assembling the array substrate and the color filter substrate.

203: forming an electrode and a light-shielding strip on a side of the color filter substrate away from the array substrate and at a position corresponding to a matrix strip in a black matrix of the color filter substrate, so that the electrode sandwiches the light-shielding strip.

Wherein, the light-shielding strip is made of polymer dispersed liquid crystal (PDLC) material or electrochromic material.

204: forming a first polarizer which covers the array substrate, on a side of the array substrate away from the color filter substrate.

205: forming a second polarizer which covers the light-shielding strip and the color filter substrate, on the light-shielding strip.

It should be noted that there is no specific order in execution of forming the first polarizer in step 204 and forming the second polarizer in step 205, and generally in actual operation, the first polarizer and the second polarizer are formed at the same time.

206: forming a patterned phase-difference film on the second polarizer.

In the fabrication method of the display panel provided by an embodiment of the present invention, when the display panel is fabricated, a light-shielding strip made of the PDLC material or the electrochromic material is disposed on a side of the color filter substrate opposite to the array substrate in the display panel and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Meanwhile, the brightness of the display device is increased, and the image quality is improved.

An embodiment of the present invention provides a fabrication method of a display panel, comprising steps of:

301: forming an array substrate and a color filter substrate.

302: cell-assembling the array substrate and the color filter substrate.

303: forming a first transparent conductive layer on a side of the color filter substrate away from the array substrate and at a position corresponding to a matrix strip in a black matrix of the color filter substrate.

304: forming a light-shielding strip on the first transparent conductive layer.

Herein, the light-shielding strip is made of polymer dispersed liquid crystal (PDLC) material or electrochromic material.

305: forming a second transparent conductive layer which covers the light-shielding strip and the color filter substrate, on the light-shielding strip.

Exemplarily, both the first transparent conductive layer and the second transparent conductive layer are made of inorganic material such as indium tin oxide (ITO), zinc oxide or indium zinc oxide mixed with fluorine, or the like.

Both the first transparent conductive layer and the second transparent conductive layer may be formed by a process such as ink-jet printing, evaporation, or photolithograph.

306: forming a first polarizer which covers the array substrate, on a side of the array substrate away from the color filter substrate.

307: forming a second polarizer on the second transparent conductive layer.

It should be noted that there is no specific order in execution of forming the first polarizer in step 306 and forming the second polarizer in step 307, and generally in actual operation, the first polarizer and the second polarizer may be formed at the same time.

308: forming a patterned phase-difference film on the second polarizer.

In the fabrication method of the display panel provided by the embodiment of the present invention, when the display panel is fabricated, a light-shielding strip made of the PDLC material or the electrochromic material is disposed on a side of the color filter substrate opposite to the array substrate in the display panel and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Meanwhile, the brightness of the display device is increased, and the image quality is improved.

An embodiment of the present invention provides a fabrication method of a display panel, comprising steps of:

401: forming an array substrate and a color filter substrate.

402: cell-assembling the array substrate and the color filter substrate.

403: forming a first transparent conductive layer on a side of the color filter substrate away from the array substrate and at a position corresponding to a matrix strip in a black matrix of the color filter substrate.

404: forming a light-shielding strip on the first transparent conductive layer.

Herein, the light-shielding strip is made of polymer dispersed liquid crystal (PDLC) material or electrochromic material.

405: forming a second transparent conductive layer which covers the light-shielding strip and the color filter substrate, on the light-shielding strip.

In the fabrication method of the display panel provided by the embodiment of the present invention, when the display panel is fabricated, a light-shielding strip made of the PDLC material or the electrochromic material is disposed on a side of the color filter substrate opposite to the array substrate in the display panel and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display device. Meanwhile, the brightness of the display device is increased, and the image quality is improved.

An embodiment of the present invention further provides a display device, and the display device comprises any display panel as described above.

In the display device provided by the embodiment of the present invention, a light-shielding strip made of the PDLC material or the electrochromic material is disposed on a side of the color filter substrate opposite to the array substrate and at a position corresponding to the matrix strip of the black matrix; when the user's visual angle is in the range of the viewing angle of the display device, a voltage is applied to the light-shielding strip so that the light-shielding strip is in a transparent state; when the user's visual angle is out of the range of the viewing angle of the display device, no voltage is applied to the light-shielding strip, so that the light-shielding strip is in a non-transparent state; accordingly, a light transmitting area of the display device remains unchanged, thus ensuring a high aperture ratio while increasing the viewing angle of the display. Meanwhile, the brightness of the display device is increased, and the image quality is improved.

Those ordinary skilled in the art can understand that: all or part of the steps for implementing the above method embodiments may be performed by a hardware under the program instruction, and the foregoing program may be stored in a computer-readable storage medium; when executed, the program may execute the steps included in the above method embodiments; and the foregoing storage medium includes: ROM, RAM, magnetic disk or optical disk, and various mediums for storing program codes.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201410302223.3 filed on Jun. 27, 2014, the disclosure of which is incorporated herein by reference in its entirety as part of the present application.

What is claimed is:

1. A display panel, comprising:
an array substrate;
a color filter substrate, cell-assembled with the array substrate and comprising a black matrix;
a plurality of light-shielding strips, disposed on a side of the color filter substrate away from the array substrate;
an electrode, sandwiching the plurality of light-shielding strips,
wherein the electrode comprises a first transparent conductive layer and a second transparent conductive layer, the first transparent conductive layer is formed between the color filter substrate and the light-shielding strip, the light-shielding strip completely covers the first transparent conductive layer, the second transparent conductive layer is formed on the light-shielding strip, completely covers the light-shielding strip and covers the color filter substrate, the first transparent conductive layer comprises a plurality of first electrode strips, each of the first electrode strips is completely covered by one corresponding light-shielding strip, and a width of an orthographic projection of each of the first transparent conductive layers on the color filter substrate is smaller than a width of an orthographic projection of one corresponding light-shielding strip on the color filter substrate,
the black matrix comprises a plurality of matrix strips, and each of the plurality of light-shielding strips corresponds to one of the matrix strips of the black matrix, and
the light-shielding strip is made of polymer dispersed liquid crystal material or electrochromic material.

2. The display panel according to claim 1, wherein a width of each of the plurality of light-shielding strips is greater than or equal to a width of each of the matrix strips of the black matrix.

3. The display panel according to claim 1, wherein the width of each of the matrix strips of the black matrix is less than or equal to a preset width.

4. The display panel according to claim 1, further comprising:
a first polarizer, formed on a side of the array substrate away from the color filter substrate and covering the array substrate;
a second polarizer, formed on the light-shielding strip and covering the light-shielding strip and the color filter substrate; and
a patterned phase-difference film, covering the second polarizer.

5. The display panel according to claim 1, further comprising:
a first polarizer, formed on a surface of the array substrate away from the color filter substrate and covering the array substrate;
a second polarizer, covering the second transparent conductive layer; and a patterned phase-difference film, covering the second polarizer.

6. The display panel according to claim 1, wherein the first transparent conductive layer and the second transparent conductive layer are made from indium tin oxide, zinc oxide or indium zinc oxide mixed with fluorine.

7. A fabrication method of a display panel, comprising:
forming an array substrate and a color filter substrate;
cell-assembling the array substrate and the color filter substrate;
forming an electrode and a light-shielding strip on a side of the color filter substrate away from the array substrate and at a position corresponding to a matrix strip in a black matrix of the color filter substrate, so that the electrode sandwiches the light-shielding strip,
wherein the electrode comprises a first transparent conductive layer and a second transparent conductive layer, the first transparent conductive layer is formed between the color filter substrate and the light-shielding strip, the light-shielding strip completely covers the first transparent conductive layer, the second transparent conductive layer is formed on the light-shielding strip, completely covers the light-shielding strip and also covers the color filter substrate, the first transparent conductive layer comprises a plurality of first electrode strips, each of the first electrode strips is completely covered by one corresponding light-shielding strip, and a width of an orthographic projection of each of the first transparent conductive layers on the color filter substrate is smaller than a width of an orthographic projection of one corresponding light-shielding strip on the color filter substrate,
wherein the light-shielding strip is made of polymer dispersed liquid crystal material or electrochromic material.

8. The method according to claim 7, further comprising:
forming a first polarizer which covers the array substrate, on a side of the array substrate away from the color filter substrate;
forming a second polarizer which covers the light-shielding strip and the color filter substrate, on the light-shielding strip; and
forming a patterned phase-difference film on the second polarizer.

9. The method according to claim 7, further comprising:
forming a first polarizer which covers the array substrate, on a surface of the array substrate away from the color filter substrate;
forming a second polarizer on the second transparent conductive layer; and
forming a patterned phase-difference film on the second polarizer.

10. The method according to claim 7, wherein the first transparent conductive layer and the second transparent conductive layer are made from indium tin oxide, zinc oxide or indium zinc oxide mixed with fluorine.

11. A display device, comprising the display panel according to claim 1.

12. A display panel, comprising:
an array substrate;
a color filter substrate, cell-assembled with the array substrate and comprising a black matrix;
a plurality of light-shielding strips, disposed on a side of the color filter substrate away from the array substrate;
an electrode, sandwiching the plurality of light-shielding strips, wherein the electrode comprises a first transparent conductive layer and a second transparent conductive layer, the first transparent conductive layer, is formed between the color filter substrate and the light-shielding strip, the light-shielding strip completely covers the first transparent conductive layer, the second transparent conductive layer is formed on the light-shielding strip, completely covers the light-shielding strip and covers the color filter substrate,
wherein the first transparent conductive layer comprises a plurality of first electrode strips, each of the first electrode strips is completely covered by one corresponding light-shielding strip, and both side edges of the one corresponding light-shielding strip extend out of both side edges of each of the first electrode strips,
the black matrix comprises a plurality of matrix strips, and each of the plurality of light-shielding strips corresponds to one of the matrix strips of the black matrix, and
the light-shielding strip is made of polymer dispersed liquid crystal material or electrochromic material.

* * * * *